July 26, 1949.  B. G. HARLEY  2,477,453
LAWN MOWER
Filed Dec. 4, 1945  3 Sheets-Sheet 1
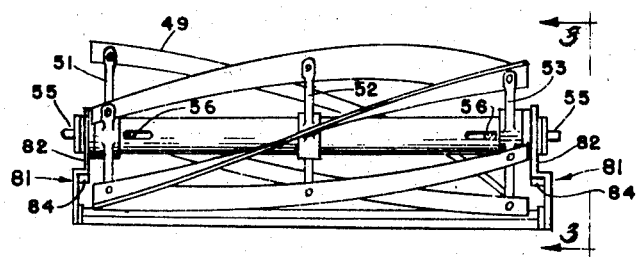
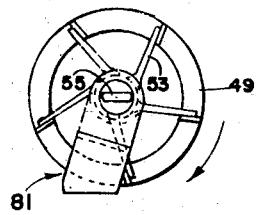
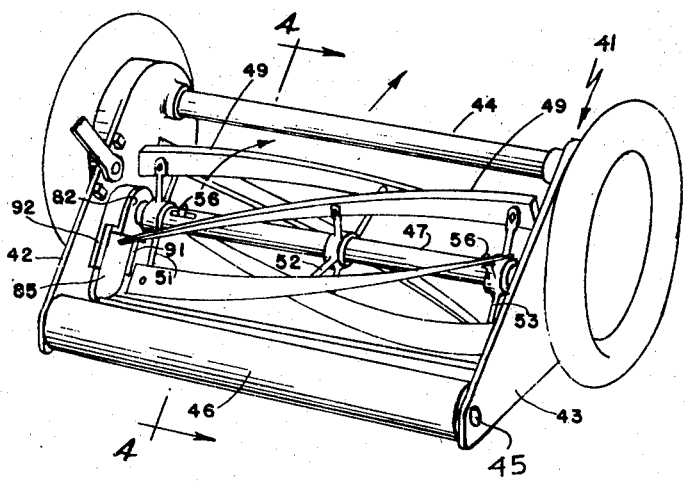
INVENTOR:
BERTRON G. HARLEY,
BY
ATTORNEY July 26, 1949.                B. G. HARLEY                2,477,453
                                LAWN MOWER
Filed Dec. 4, 1945                                    3 Sheets-Sheet 2

INVENTOR:
BERTRON G. HARLEY,
BY
Arthur Middleton
ATTORNEY

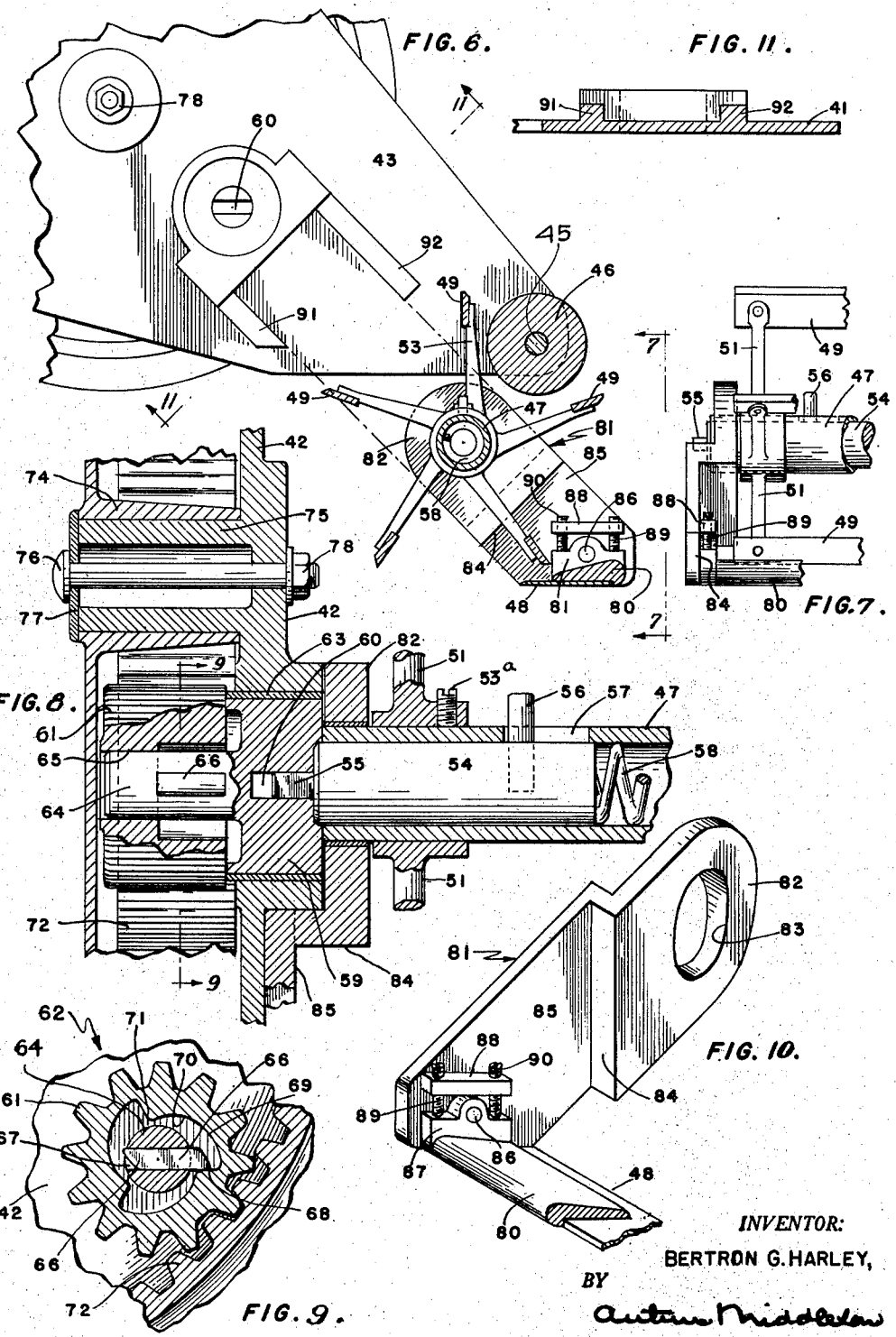

Patented July 26, 1949

2,477,453

UNITED STATES PATENT OFFICE 2,477,453

LAWN MOWER

Bertron G. Harley, Penn Yan, N. Y.

Application December 4, 1945, Serial No. 632,649

4 Claims. (Cl. 56—249)

This invention relates to lawn mowers in which a wheeled frame or carriage has mounted in it a horizontal blade-carrying cutter shaft which is driven through gearing from the wheels of the carriage when the same is being moved.

In a conventional lawn mower the cutter shaft has fixed to it a set of grass-cutting blades equidistantly spaced from one another along a circle about the shaft, each blade usually being somewhat spiral relative to the shaft. The cage-like structure represented by the shaft and the blades carried by it is termed "the reel" or "blade reel" of the lawn mower. The blades of the reel co-act with a relatively stationary horizontal straight counter- or shear-blade mounted upon the frame, whereby there is produced a shearing action upon the grass caught between each of the rotary blades and the stationary counter-blade.

More specifically this invention relates to improvements whereby the operation of sharpening the blades is facilitated.

Heretofore, whenever the blades required sharpening they had to be either dismounted individually from their carrier shaft or else the lawn mower had to be dismantled to the point where the shaft as a whole together with the blades could be separated from the drive gear train of which in effect it formed a part.

To detach the individual blades to sharpen them and then to re-install them may result in misalignment of the blades and consequent unsatisfactory cutting operation, while the disconnection of the cutter shaft or reel as a whole from its gear train is at least a cumbersome operation. Hence, usually the entire lawn mower is turned over to some all-around repair shop to do the sharpening as best it can and in whatever manner it chooses to perform this task.

It is among the objects of this invention to render the task of sharpening the lawn mower blades relatively less time-consuming, less cumbersome and less expensive, even while resulting in uniformly high accuracy of assembly and high cutting efficiency.

Another object is to simplify for its owner the business of having the lawn mower sharpened, yet making available to him a lawn mower that is in effect continuously in good working order as regards the condition of the blades.

According to this invention these objects are attained by rendering the blade-carrying portion of the cutter shaft together with the counter- or shear-blade detachable without disturbance or dismantling of the associated parts of the lawn mower and especially without requiring any disturbance of the drive gear train that actuates the shaft.

It is among the advantages resulting from this improvement that the consumer, that is the owner of the lawn mower, may obtain from the factory or its agent a freshly sharpened, that is to say a competently sharpened or factory-sharpened replacement cutter-reel while turning in his dull one for sharpening, somewhat comparable to the manner in which an automobile owner turns in his run-down battery for recharging while being supplied in the interim with a freshly charged substitute battery.

The owner of a lawn mower may order from the factory a sharpened substitute cutter reel packed in a suitable special shipping container which container will also serve the recipient for returning the old cutter to the factory or else the customer or lawn mower owner may be supplied with such a shipping container in which he may send in the old cutter unit when ordering the substitute.

When the counter blade is unitary with the rotary cutter reel as proposed by this invention, such a detachable unit can be exchanged as a whole. In this way the proper cutting or shearing relationship between the co-acting blades, that is between the stationary blades and the rotary blades, is insured in the exchange of the unit, with no greater effort required of the owner than to exchange the unit in the lawn mower by coupling or uncoupling the detachable shaft portion, and using the same shipping container in which the new unit was received for returning the old unit to the factory.

According to this invention a detachable sub-assembly comprises a detachable shaft portion carrying the cutter blades, and a pair of arms rotatable upon the ends of this shaft portion although rigidly interconnected by the counter- or shear-blade. There are coupling means for operatively connecting each end of the detachable shaft portion with the surrounding machine frame, and also constituting anchoring means for the sub-assembly upon the frame. Furthermore, there are provided rotation-preventing means upon the frame for positioning the arms of the sub-assembly in fixed relation to the frame once the sub-assembly has been positioned thereon. The arrangement is that this sub-assembly is inserted from below into the surrounding frame.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a view of the lawn mower with the cutter shaft removable together with the counter-blade.

Fig. 2 shows the cutter shaft and counter-blade unit per se, that is detached from the frame of the lawn mower.

Fig. 3 is an end view taken along line 3—3 of the unit shown in Fig. 2.

Figure 4:
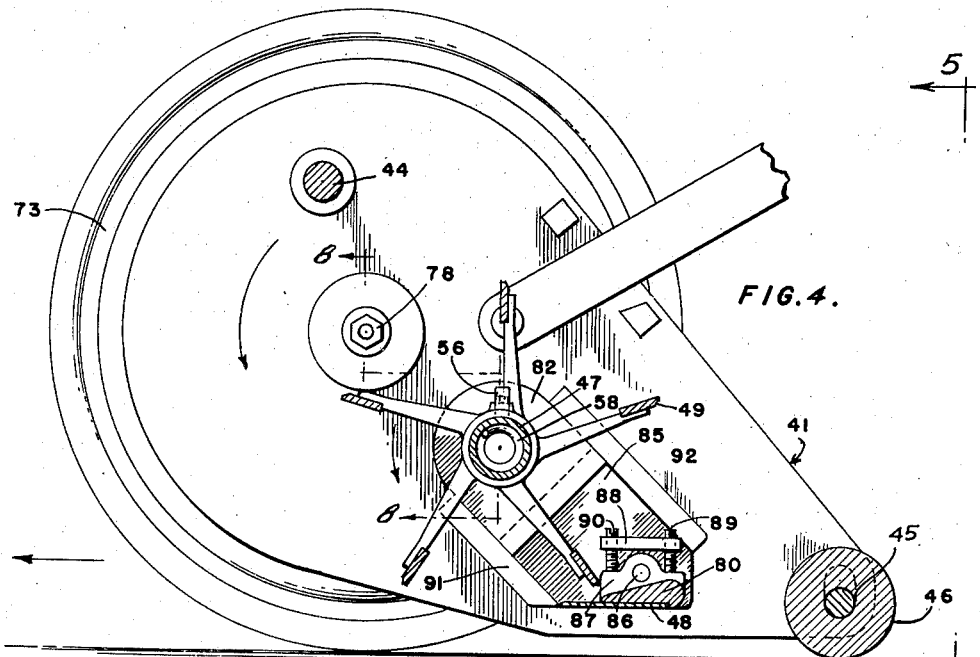
Figure 5:
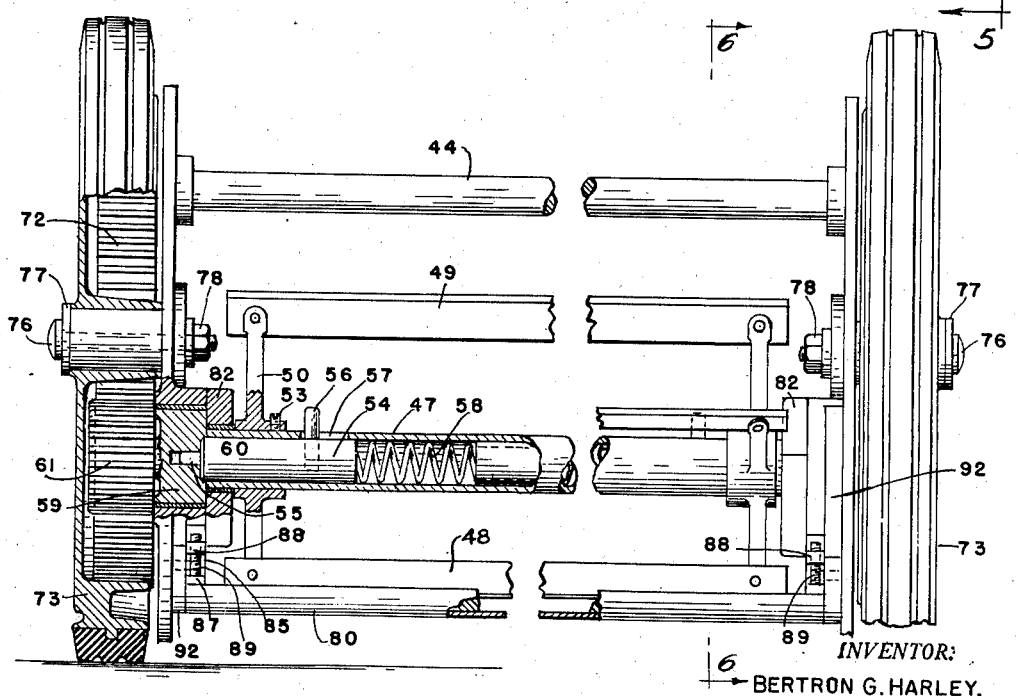

Figs. 4 to 11 represent enlarged sections, views and details of the Fig. 1 embodiment; Fig. 4 being an enlarged vertical sectional view on line 4—4 of Fig. 1; Fig. 5 being a front elevational view indicated by the line 5—5 in Fig. 4 with parts removed; Fig. 6 being a sectional view representing an enlarged portion of Fig. 4 although showing the cuttershaft-counterblade unit displaced from the lawn mower frame and taken on line 6—6 of Fig. 5; Fig. 7 being a view of one end portion of the cuttershaft-counterblade unit as indicated by the line 7—7 in Fig. 6; Fig. 8 being a further enlarger detailed sectional view of the left end mounting of the cuttershaft and of associated drive gearing therefor, taken on the line 8—8 in Fig. 4; Fig. 9 being a further detailed section taken along the line 9—9 of Fig. 8, showing a pawl and ratchet device; Fig. 10 being a perspective view of the mounting of the counter-blade, and Fig. 11 being a further detailed sectional view of the coupling means for the cutter-shaft taken along the line 11—11 in Fig. 6.

The lawn mower comprises a wheeled frame 41 having side plates 42 and 43 rigidly interconnected at their forward end by a cross rod 44 and at their rearward end by a connecting member 45. At its extreme rearward end the frame carries a guide roller or idler 46 rotatable upon the connecting member 45, the rotary axis of which is parallel to that of a cutter-shaft 47 and of a counter-blade 48, both the cutter-shaft and the counter-blade being removable as a unit from the frame 41 (see Figs. 2, 3 and 6).

The cutter-shaft 47 carries cutter blades 49 mounted upon spider elements 50, 51, 52 fixed upon the cutter-shaft 47 as by set screw 53a (see Fig. 8). In one end of the hollow cutter-shaft there is telescopically slidable a coupling member 54 having a flattened protrusion 55 at the outer end and a finger piece 56 extending through an elongated or slat-like opening 57 in the wall of the hollow cutter shaft 47. The coupling member 54 is urged outwardly by a compression coil spring 58 disposed within the bottom cutter shaft 47. The coupling member 54 has rotation transmitting connection with a stub shaft 59 by way of the protrusion 55 engaging in a recess 60 in the stub shaft 59 driven by a pinion 61 through a one-way or pawl-and-ratchet connection 62 more clearly shown in Fig. 16. The stub-shaft 59 is journaled in the side plate 42 by way of a bushing 63 and has an outward axially extending reduced or pivot portion 64 which in turn is journaled at 65 in the pinion 61. The one-way drive connection 62 between the sub-shaft 59 and the pinion 61 comprises a sliding pawl member 66 slidable transversely of the axis of rotation of the stub-shaft 59, namely in a slotted opening 67 traversing the pivot portion 64. The pawl 66 engages the radial face 68 of three internal recesses 69 in the pinion 61 when driving the stub-shaft 59, but slides over the convexly curved faces 70 and over the humps 71 to compensate for speed differentials when the cutter shaft 59 rotates faster than the pinion 61. The pinion 61 meshes with and is driven by an internal gear 72 which is rotatably mounted upon the side plate 42 and is unitary or in fact identical with a wheel 73 supporting the frame 41. The wheel 73 has a cylindrical hub portion 74 rotatable upon a hollow stub portion 75 extending laterally outwardly from the side plate 42 and shown to constitute a part thereof. The wheel 73 is held in place by a bolt 76 having a washer 77 at its outer end and a nut 78 at its inner end.

A counter-blade 48 is unitary with the cutter-shaft 47 in that the blade is mounted upon a blade holder bar 80 each end of which is supported by a bracket or mounting 81 which in turn is rotatably mounted upon the respective adjacent end of the cutter-shaft 59. The bracket 81 comprises an inner end portion 82 having a hole 83 whereby it is rotatably mounted upon the cutter shaft 59, an offset portion 84 extending at right angles from the inner end portion 82 and towards the side plate 42, and an outer end portion 85 having a laterally extending pivot 86 over which fits a terminal portion 87 of the blade holder bar 80 carrying the counter-blade 48. The outer end portion 85 of the bracket 81 also has fixed thereto a block 88 into which are threaded a pair of set screws 89 and 90 to hold the blade holder 80 in an adjusted position relative to the cutter blades 49. The bracket 81 is positioned relative to the side plate 42 of the frame by a pair of rail or guide portions 91 and 92 between which the outer end portion 85 of the bracket 81 has a sliding fit.

The construction of the other side plate 43 of the frame and all parts associated therewith is symmetrically identical to that just described in connection with the side plate 42.

The procedure of removal of the cutter-shaft counter-blade unit is illustrated in and substantially self-explanatory from Fig. 6. That is to say, the finger pieces 28, 33 of the coupling portions 27 and 32 are pressed inwardly against the pressure of their springs 30 and 35 when the unit may be removed from the frame in a rearward downward direction.

Accordingly, the removal of the blade-carrying unit is self-explanatory, particularly in view of the illustration in Figs. 6 and 8.

It should be understood that while this invention is herein shown in connection with a hand-driven lawn mower a prime mover or gasoline engine may be substituted for hand power. In other words, the invention applies also to a combination in which a power driven unit is mounted upon the frame with drive means for transmitting the drive power from the prime mover to the frame-supporting wheels or to the cutter shaft direct.

I claim:

1. A lawn mower comprising a wheeled carriage frame having side plates and transversely extending tie members rigidly interconnecting them, a drive gear train mounted on the side of said carriage frame and driven from an associated carriage wheel, a horizontal rotary cutter shaft journalled in said frame and driven by said gear train, said shaft comprising an end portion rotatably mounted in said frame and constituting a part of said gear train and a detachable portion separable from said end portion and carrying grass-cutting blades rotating with the shaft, coupling means for detachably connecting said detachable shaft portion with said driven end portion and constituting a driving connection for said detachable shaft portion as well as an anchoring connection for said detachable shaft portion with said frame, a counter-blade extending parallel and spaced downwardly and rearwardly with respect to said shaft and having grass-cutting relationship with the blades, bracket means for removably mounting said counter-blade upon said frame in said relationship, said bracket means comprising an arm at each end of said blade and having fixed relationship therewith, the outer end of each arm being swingably mounted upon the corresponding end portion of said removable shaft portion and being removable therewith in a rearwardly and downwardly inclined direction with respect to said frame, and rotation-preventing means effective between said frame and said arms whereby said arms are maintained in a predetermined position relative to the frame and relative to said cutting blades.

2. A lawn mower according to claim 1, in which said rotation preventing means comprise a pair of parallel guide ledges provided upon the inner face of each side plate of the frame.

3. A lawn mower according to claim 1, with the addition of adjusting means for adjustably fixing the angular relationship between the plane of said counter-blade and said arms.

4. A lawn mower according to claim 1, with the addition of adjusting means for adjustably fixing the angular relationship between the plane of the counter-blade and said arms, which adjusting means comprise a blade-holding element coextensive with said counter-blade, a pivotal connection between each of said arms and the adjacent end of said blade-holding element, a pair of adjusting screws provided upon one of said arms and operable in opposition to each other while engaging the adjacent end of said blade-holding element in a manner to maintain said angular relationship.

BERTRON G. HARLEY.

REFERENCES CITED

The following references are of record in the file of this patent:

UNITED STATES PATENTS

| Number | Name | Date |
| --- | --- | --- |
| 999,122 | Pennell | July 25, 1911 |
| 1,583,124 | Coffland | May 4, 1926 |
| 2,283,161 | Booton | May 19, 1942 |